United States Patent Office 3,209,421
Patented Oct. 5, 1965

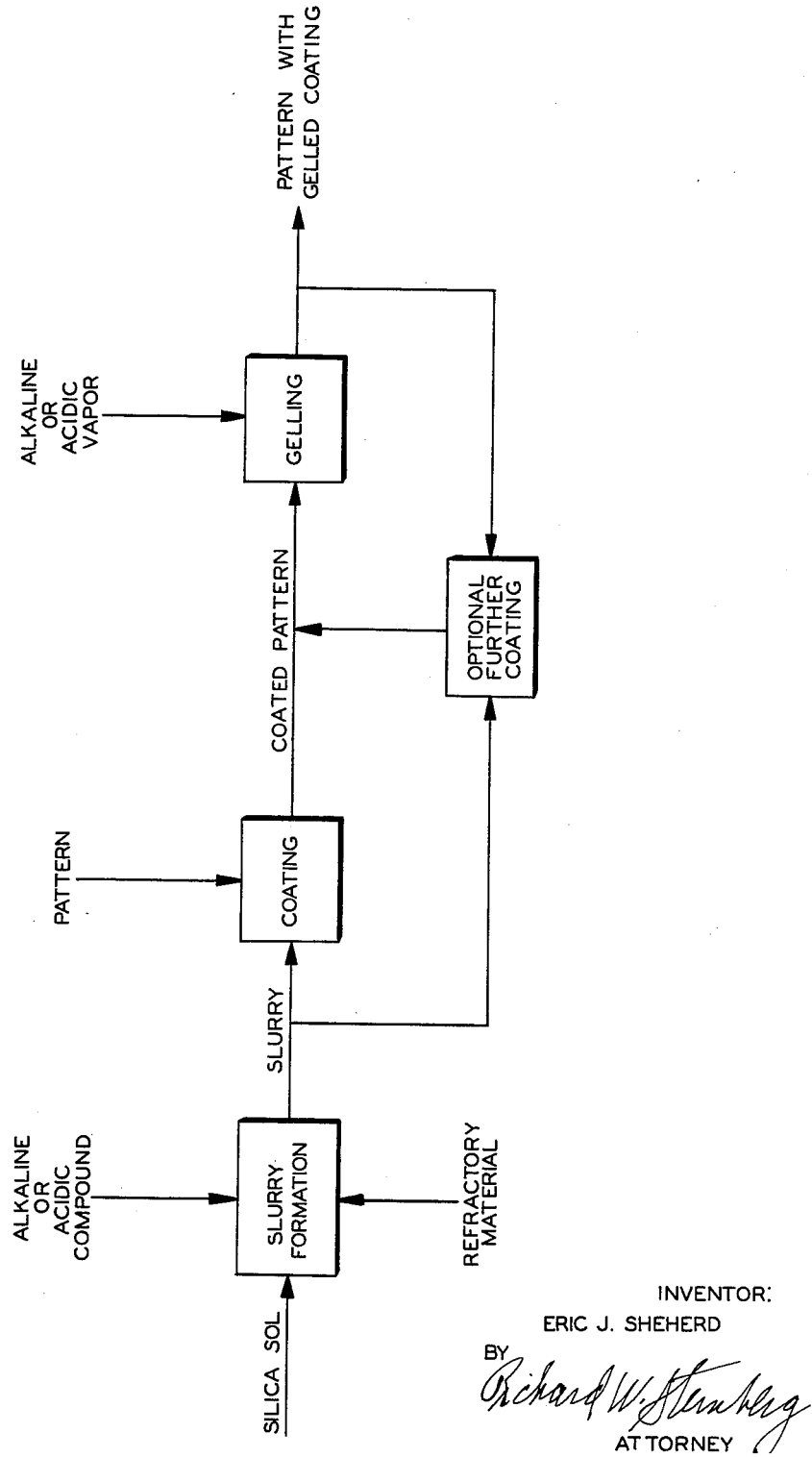

3,209,421
PRODUCTION OF REFRACTORY MOLDS
Eric James Shepherd, Middlesex, England, assignor to Monsanto Chemicals Limited, London, England, a British company
Filed Mar. 20, 1962, Ser. No. 181,180
Claims priority, application Great Britain, Mar. 30, 1961, 11,636/61
13 Claims. (Cl. 22—196)

This invention relates to the production of refractories, using aqueous silica sols as binding medium.

Various ways of preparing refractories such as for instance refractory molds have been proposed, and one which is economical in its use of starting-materials is the so-called shell molding process. In this process a shell is formed round a pattern, which can for instance be made of wax, by coating the pattern with a slurry containing a powdered refractory; allowing the slurry to gel; removing the pattern in some appropriate way; and heating the gelled slurry to a temperature at which the particles of the refractory material are bound together to give a strong shell mold.

To build up a shell of sufficient thickness to act as a mold in metal casting it is generally found necessary to apply several coats of slurry, so that the final shell has a laminated structure. Each coat must of course be allowed sufficient time to gel before the application of the next, and the time taken to form the finished shell therefore depends largely on the speed with which the slurry gels.

An aqueous silica sol (that is to say a stable colloidal dispersion of silica in water) offers a means of gelling a slurry of refractory material, but since the silica sol is a stable liquid (which does not gel readily under normal conditions) it is accordingly necessary to accelerate the speed with which it gels so that the operation of preparing a refractory mold can be carried out in a reasonable time. Gelation accelerators that have been proposed for addition to a slurry include for instance ammonium chloride and calcium chloride.

This procedure is very satisfactory in the production of block investment molds, but it is less convenient in making other types of molds and particularly shell molds. In the latter instance it is clearly desirable that the cost of slurry applied to the pattern should gel rapidly, but on the other hand the reservoir of slurry that is being used needs to remain in an ungelled condition, otherwise too much material would be wasted.

A procedure has now been found by which a slurry containing an aqueous silica sol as a binding medium can be gelled rapidly and at any chosen time.

The process of the invention is one for the production of a refractory, in which there is employed a slurry comprising a refractory material and an aqueous silica sol and the slurry used in forming the refractory is gelled when required by the reaction of an acidic substance and a basic substance, one of which is present in the slurry while the other is employed as a vapour to which the slurry is exposed.

The process is useful in the production of molds and particularly of shell molds. Preferably the acidic substance (for instance hydrochloric acid) is present in the slurry, and the basic substance (for instance ammonia) is employed as the vapour.

In the process of the invention where the acidic substance is incorporated in the slurry this is normally an acid; it can be chosen from a wide range of water-soluble inorganic and organic acids, including for example hydrochloric, sulphuric, phosphoric, acetic and oxalic acids; hydrochloric acid gives excellent results. Where the acidic substance is employed as a vapour to which the slurry is exposed then it is preferably carbon dioxide, although other acidic vapours, such as the hydrogen halides, sulphur dioxide and oxides of nitrogen, can be employed.

The basic substance employed is preferably ammonia; it can be incorporated in the slurry or can be employed as a vapour to which the slurry is exposed. However, base anhydrides that are sufficiently volatile can in general be used as a vapour; suitable organic ones include amines such as for instance ethylamine or diethylamine. Other base anhydrides that can be incorporated in a slurry include less volatile water-soluble amines such as for instance piperidine, morpholine, diethanolamine and cyclohexylamine.

The acidic or basic substance (as the case may be) is usually added to the aqueous silica sol before admixture with the refractory material. Other procedures can however be followed if desired. When an acidic substance is added to the silica sol the amount used can for instance be such that its solution in the aqueous silica sol is within the range 5.0 N to 0.01 N, particularly for instance about 1.0 N to about 0.1 N. When a solution of a basic substance in the aqueous silica sol is employed, this can have a concentration of from about 10.0 N to about 0.1 N; good results have been obtained with concentrations within the range 5.0 N to 1.0 N, for instance about 3.0 N or about 1.5 N.

Some acidic substances and some basic substances are of course even when employed alone capable of exerting an accelerating effect on the gelation of aqueous silica sols. It is however, perfectly practical to choose either an acidic substance or a basic substance that can be present in the slurry at an appropriate concentration without gelling the silica sol—or at any rate a substance that has such a slow effect on gelation at the concentration employed that the slurry has a sufficiently long storage life. When required the slurry is of course gelled rapidly by means of the process of the invention.

Any of the standard refractory fillers can be used in preparing the slurry; for example refractory oxides and silicates such as for instance alumina, sillimanite and zircon are suitable. Silica, for instance powdered flint, can also be employed.

In producing a shell mold the particle size of the refractory filler used in preparing the slurry is preferably less than 200 mesh, that is to say, none of the powder is retained on a 200 mesh British Standard Sieve (B.S.S.), and preferably the refractory should contain a significant proportion, perhaps 50 to 75%, of material of particle size less than 300 mesh. The slurry can be prepared simply by mixing the powdered refractory filler a little at a time with the silica sol until the slurry formed has a viscosity in the correct range; such a viscosity often corresponds roughly with the consistency of a thin cream. A slurry of suitable viscosity can for example contain between about 30 and about 90 parts of the silica sol per 100 parts by weight of the refractory filler, depending mainly on the type and state of subdivision of the filler. After the first coating has been applied and gelled further coatings are added, often to a total of for instance six or more.

In making other types of mold, for example two-piece molds, similar procedures are adopted, with appropriate changes in the refractory filler and the constitution of the slurry. The latter for example in some instances has a high viscosity, and can be virtually a solid. As well as molds other refractories can be produced, for example crucibles. Moreover, the inner surface of a mold made in a conventional way can be coated with a slurry that is gelled by the process of the invention.

The aqueous silica sol can suitably be one containing perhaps 15% to 50% by weight of silica colloidally suspended in the water; such a sol is stable by virtue of the fact that each silica particle is surrounded by an atmosphere of ions in an electrical double-layer. A typical aqueous silica sol has an $SiO_2:M_2O$ weight ratio (where M is a metal, for instance sodium or potassium) between 40:1 and 500:1, for instances between 60:1 and 300:1; preferably the range is between 80:1 and 150:1, for instance about 100:1. Good results are obtained when the concentration of silica in the sol is within the range of from 20% to 40% by weight, particularly when the concentration is about 30% by weight. However, the concentration of the silica in the sol may be as high as 55% by weight or more in some instances. The aqueous sols that are commercially availbale under the names "Syton" 2X and "Syton" P ("Syton" is a registered trademark) are especially useful; these are stable sols in which about 30% by weight of silica is dispersed in water. The more useful aqueous silica sols (that is, the sols employed prior to the addition of the acidic or basic substance) for use in the processes of this invention are those which, in addition to having the characteristics referred to above, contain less than 1.5% by weight of inorganic salts, for example, $MCl$ or $M_2SO_4$ (where M is an alkali metal) or other salts, preferably less than 1% by weight of such salts, and more desirably less than 0.3% by weight of such salts. Also, the more useful aqueous silica sols contain silica particles having a particle size in the range of about 5 to about 250 millimicrons, and preferably in the range of about 10 to about 100 millimicrons; these particles being preferably spherical or substantially spherical although some of the particles may be joined together as doublets or triplets, etc.

It is sometimes preferable, particularly where a wax pattern is employed, to have a wetting agent present in the slurry. The wetting agents can be one of the conventional nonionic or anionic materials. A nonionic agent such as a condensation product of ethylene oxide with an alcohol or phenol gives good results. It may be desirable in addition for an antifoaming agent, for example a higher alcohol, to be present.

Illustrative of anionic wetting agents which may be used in the slurry are the sulfated and sulfonated alkyl, aryl and alkyl aryl hydrocarbons described in U.S. Patent No. 2,846,398, issued August 5, 1958, particularly those described in column 4, lines 35–75 and column 5, lines 1–6, of that patent. In addition to the condensation product of ethylene oxide with an alcohol or phenol, referred to in the preceding paragraph, other nonionic wetting agents may be used in the slurry, including, for example, the various nonionic agents described in the same U.S. Patent No. 2,846,398, particularly those described in column 5, lines 41–74. Other typical examples of anionic and nonionic wetting agents are described in Schwartz and Perry, "Surface Active Agents," Interscience Publishers, New York (1949); and Journ. Am. Oil Chemists Society, Volume 34, No. 4, pages 170–216 (April 1957). In order to avoid unnecessary enlargement of this specification, the subject matter relating to anionic and nonionic agents in these publications is incorporated herein by reference. It is also to be understood that anionic and nonionic wetting agents other than those described in these publications may be used in the slurry of refractory material and aqueous silica sol.

Normally the aqueous silica sol in the slurry is gelled at room temperature by exposure to the vapour of the acidic or the basic substance. If desired, however, the operation can be carried out at temperatures above normal ambient temperature, perhaps for instance at 40° C. or 50° C.

The manner in which the exposure is effected will depend on factors such as the size and type of refractory being produced. An acidic slurry, for instance the coating on a pattern in producing a shell mold, can be gelled for example by transferring the slurry-coated pattern to a chamber provided with an open reservoir containing a strong aqueous solution of a suitable base, for instance ammonia. Alternatively for instance a stream of the ammonia vapour can be passed through a chamber in which the slurry coated pattern is situated. Where the vapour of for instance carbon dioxide is required for the gelation of a slurry containing a base, this can conveniently be arranged by having a block of solid carbon dioxide inside the chamber. In the case of an investment or a two-piece mold, the most convenient procedure usually is to direct a stream of the required vapour on to the surface of the mold when gelation is required. Here the preferred vapour is often carbon dioxide, which in view of its relatively innocuous nature can be used in conjunction with an alkaline slurry without the necessity for a special enclosure.

The duration of the exposure required to effect gelation will vary somewhat depending on such factors as the thickness of the slurry that is being employed in poducing the refractory, as well as the precise formulation of the slurry. Often for instance an exposure of at least 30 seconds but not more than 5 minutes is sufficient, although in some circumstances longer exposures may be preferable. The optimum duration of exposure for any given set of conditions is of course readily determined.

The final stages in the production of a refractory by the process of the invention follow established practice. For example, when gelation of a shell or investment mold is complete the product is normally dried; the fusible pattern is removed; and the mold is heated to a high temperature at which the gel is converted to silica.

In the accompanying drawing (which is a flowsheet illustrating the processes of this invention) the process outlined comprises the steps of (1) forming a slurry composed of the ingredients hereinbefore described, namely (a) the silica sol, (b) refractory material and (c) the alkaline or acidic substance or compound; (2) the coating of a pattern, for example a wax pattern, with the slurry; and (3) the gelling of the slurry coating on the pattern by exposure to an alkaline or acidic vapor, an acidic vapor being used if the slurry contains an alkaline compound and an alkaline vapor being used if the slurry contains an acidic compound. The product resulting from such process is a pattern having a gelled coating of the slurry thereon and the product is dried at an elevated temperature. As described in the present disclosure, the pattern and coating are separated so that the coating becomes the refractory mold, and this is suitably accomplished by using a fusible pattern which can be heated to the molten state and separated in this state from the mold or coating. An alternative procedure in the process outlined in the flow sheet of the drawing permits the pattern to be coated several times with the slurry before the coating on the pattern is subjected to the gelling procedure.

The process of the invention is illustrated by the following examples.

*Example 1*

This example describes the production of a refractory shell mold by a process in which an acidified slurry is gelled by exposure to ammonia vapour.

A slurry was pepared from 160 grams of sillimanite having a particle size less than 200 B.S.S. mesh and 100 grams of "Syton" 2X (a stable silica sol containing 30% by weight of silica colloidally dispersed in water) to which had been added sufficient concentrated hydrochloric acid to give an approximately 0.1 N solution (about 1.5 cc.). There were also present 0.5 gram of Lissapol NX (a condensation production of ethylene oxide with octylphenol) and 1 gram of n-octanol (an anti-foaming agent). Typically, "Syton" 2X as employed in this example has the following characteristics, in addition to those referred to above: (1) the average particle size of the silica particles dispersed in water is about 25 millimicrons, (2) the pH of the sol is between about 9 and about 10, (3) the silica to $Na_2O$ ratio is about 100:1, and (4) the sol contains less than 0.1% by weight of a salt.

A wax pattern of a turbine blade provided with a length of stout wire to act as a handle was then dipped into the slurry, rotated slowly to ensure a uniform coating and the absence of entrapped air bubbles, and then removed and allowed to drain for 30 seconds. A "stucco" of powdered sillimanite of particle size such that none was retained on a 40 mesh B.S.S. sieve but all was retained on an 80 mesh B.S.S. sieve was then applied to the wet surface as uniformly as possible, its function being partly to provide a key for the second coating of slurry to be applied later. The coated pattern was then transferred to a chamber provided with an open reservoir of concentrated aqueous ammonia (specific gravity 0.880) and rotated slowly in the ammonia-enriched atmosphere for 1 minutes. At the end of this period the coating had hardened, and after allowing a further 2 minutes for the excess ammonia to evaporate, a second coating of slurry was applied. The process was repeated applying alternately stucco and slurry until a total of 8 layers had been built up. After exposure of the final layer to ammonia, the coated pattern was dried in a stream of warm air.

The wire handle was withdrawn, and the whole assembly was heated to melt the wax which was then poured out of the mold. After firing at about 1,000° C. there was obtained a strong shell mold in which a metal turbine blade could be cast.

*Example 2*

This example describes the production of a refractory shell mold by a process in which an alkaline slurry is gelled by exposure to carbon dioxide.

A slurry was prepared from 300 grams of zircon having a particles size less than 200 B.S.S. mesh and 100 cc. of "Syton" 2X to which had been added 8 grams of ammonia solution (specific gravity 0.880) giving a solution 1.6 N with respect to ammonia.

A coating of the slurry and stucco was applied to a wax pattern as described in the previous example, and the coated pattern was then transferred to a chamber in which an atmosphere of carbon dioxide was provided by the evaporation of a block of the solid material. After about 2 minutes the coating had hardened sufficiently to be re-dipped into the slurry. A total of eight dip coats was applied, and the shell was finally dried and fired as described in the previous example.

What I claim is:

1. A process for the production of a refractory mold which comprises applying to a fusible pattern a coating of a slurry of (1) a refractory material, (2) an initially stable aqueous silica sol containing from about 20 to about 40% by weight of silica and having an $SiO_2$ to $Na_2O$ weight ratio of about 60:1 to about 300:1, and (3) an acidic substance which is incorporated in said silica sol by adding to said sol an amount of said acidic substance sufficient to provide a concentration in said silica sol of 5.0 N to 0.01 N, exposing said coating to vapours of a basic substance for a time of about 5 seconds to about 5 minutes to effect gelation of said coating, applying to the resulting gelled coating at least one additional coating of said slurry, exposing the resulting coating to vapours of a basic substance for a period of about 5 seconds to about 5 minutes to effect gelation of said additional coating, subsequently drying the gelled coatings and thereafter removing said fusible pattern.

2. A process as in claim 1, wherein said acidic substance is HCl which is incorporated in said sol in an amount sufficient to provide a concentration of HCl in said sol of about 1.0 N to about 0.1 N, and said basic substance is ammonia.

3. A process for the production of a refractory mold which comprises applying to a fusible pattern a coating of a slurry of (1) a refractory material, (2) an initially stable aqueous silica sol containing from about 20 to about 40% by weight of silica and having an $SiO_2$ to $Na_2O$ weight ratio of about 60:1 to about 300:1, and (3) a basic substance which is incorporated in said sol by adding to said sol an amount of said basic substance sufficient to provide a concentration in said silica sol of about 10.0 N to 0.1 N, exposing said coating to vapours of an acidic substance for a time of about 5 seconds to about 5 minutes to effect gelation of said coating, applying to the resulting gelled coating at least one additional coating of said slurry, exposing the resulting coating to vapours of an acidic substance for a time of about 5 seconds to about 5 minutes to effect gelation of said additional coating, subsequently drying the gelled coatings and thereafter removing said fusible pattern.

4. A process as in claim 3, wherein said basic substance is $NH_3$ which is incorporated in said sol in an amount sufficient to provide a concentration of $NH_3$ in said sol of about 5.0 N to about 1.0 N, and said acidic substance is carbon dioxide.

5. A process for the production of a refractory mold which comprises forming a slurry from (1) a stable aqueous silica sol, (2) a compound as hereinafter defined and (3) a refractory material, applying to a pattern at least one coating of the said slurry and thereafter exposing said coating to a vapor as hereinafter defined to gel said slurry, said silica sol containing silica particles and having an $SiO_2:M_2O$ weight ratio of between 40:1 and 500:1, where M is a metal, said compound being acidic when said vapor is alkaline and being present in a concentration with respect to said silica sol within the range of 5.0 N. to 0.01 N, and said compound being alkaline when said vapor is acidic and being present in a concentration with respect to said silica sol in the range of from about 10.0 N to about 0.1 N.

6. A process as in claim 5, wherein the refractory produced is a refractory shell mold.

7. A process as in claim 6, wherein the aqueous silica sol employed contains about 20% to about 40% by weight of silica.

8. A process as in claim 7, wherein the slurry is exposed to the vapour for a time of about 5 seconds to about 5 minutes.

9. A process as in claim 5, wherein the acidic substance is present in the slurry and the basic substance is employed as the vapour.

10. A process as in claim 9, wherein the acidic substance is hydrochloric acid and the basic substance is ammonia.

11. A process as in claim 5, wherein the basic substance is present in the slurry and the acidic substance is employed as the vapour.

12. A process as in claim 11, wherein the basic substance is ammonia and the acidic substance is carbon dioxide.

13. A process as in claim 5, wherein said pattern is a fusible pattern and at least several coatings of said slurry are applied to said pattern and gelled after each application of the coatings to said pattern, the coated pattern is dried, the fusible pattern is removed and the resulting gelled mold is heated to a high temperature at which the gel is converted to silica and said refractory material.

References Cited by the Examiner

UNITED STATES PATENTS

| | | | |
|---|---|---|---|
| 2,806,270 | 9/57 | Shaul | 106—38.3 |
| 2,824,345 | 2/58 | Zifferer | 106—38.3 |
| 2,945,273 | 7/60 | Herzmark et al. | 22—193 |
| 2,948,032 | 8/60 | Reuter | 22—193 |
| 3,074,802 | 1/63 | Alexander et al. | 106—38.3 |
| 3,131,999 | 5/64 | Suzuki et al. | 22—196 |

FOREIGN PATENTS

| | | |
|---|---|---|
| 554,701 | 3/58 | Canada. |
| 787,052 | 11/57 | Great Britain. |

MARCUS U. LYONS, *Primary Examiner.*

MICHAEL V. BRINDISI, *Examiner.*